US008849255B2

(12) United States Patent
Choti et al.

(10) Patent No.: US 8,849,255 B2
(45) Date of Patent: *Sep. 30, 2014

(54) SYSTEM FOR VERIFYING ACCESS BASED ON A DETERMINED GEOGRAPHIC LOCATION OF A SUBSCRIBER OF A SERVICE PROVIDED VIA A COMPUTER NETWORK

(75) Inventors: Joseph Francis Choti, Stockton, NJ (US); Justin Alexander Shaffer, New York, NY (US); Christopher Sun, New York City, NY (US); Shadeed S. Willis, Jersey City, NJ (US)

(73) Assignee: MLB Advanced Media, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,957

(22) Filed: Jun. 27, 2012

(65) Prior Publication Data
US 2012/0271946 A1  Oct. 25, 2012

Related U.S. Application Data

(60) Continuation of application No. 13/088,843, filed on Apr. 18, 2011, now Pat. No. 8,213,898, which is a continuation of application No. 12/362,834, filed on Jan. 30, 2009, now Pat. No. 7,929,954, which is a division of application No. 11/012,889, filed on Dec. 15, 2004, now Pat. No. 7,486,943.

(51) Int. Cl.
*H04W 4/02* (2009.01)
*H04W 4/16* (2009.01)
*H04L 29/06* (2006.01)
*G06Q 30/00* (2012.01)
*G06F 17/50* (2006.01)
*G06Q 10/00* (2012.01)
*G06Q 30/02* (2012.01)
*H04L 29/08* (2006.01)
*G06Q 30/06* (2012.01)
*G06Q 10/08* (2012.01)
*H04W 12/08* (2009.01)

(52) U.S. Cl.
CPC ........ *G06Q 10/0875* (2013.01); *G06Q 30/0267* (2013.01); *H04L 67/18* (2013.01); *G06Q 30/0601* (2013.01); *H04L 63/107* (2013.01); *G06Q 30/0257* (2013.01); *G06Q 30/0261* (2013.01); *H04W 12/08* (2013.01); *H04L 63/104* (2013.01); *G06Q 30/02* (2013.01); *H04W 4/02* (2013.01); *H04L 63/102* (2013.01); *G06Q 30/0205* (2013.01)
USPC ................. 455/414.1; 455/404.2; 455/418; 455/419; 455/456.1; 455/456.2; 455/456.3; 455/456.4; 455/456.6; 455/410; 455/415; 705/14.58; 705/14.64; 705/7.34; 705/26.1; 705/29

(58) Field of Classification Search
CPC .......... H04W 4/02; H04W 4/16; H04L 29/06; H04L 67/28
USPC ................. 455/404.2, 414.1, 414.2, 414.3, 455/418–420, 456.1–456.7, 410, 415; 705/14.58, 14.64, 7.34, 26, 29, 26.1
See application file for complete search history.

(56) References Cited

U.S. PATENT DOCUMENTS

| | | |
|---|---|---|
| 6,108,533 A | 8/2000 | Brohoff |
| 6,377,810 B1 | 4/2002 | Geiger et al. |
| 6,492,997 B1 | 12/2002 | Gerba et al. |
| 6,629,136 B1 | 9/2003 | Naidoo |
| 6,665,715 B1 | 12/2003 | Houri |
| 6,684,250 B2 | 1/2004 | Anderson et al. |
| 6,697,018 B2 | 2/2004 | Stewart |
| 6,757,740 B1 | 6/2004 | Parekh et al. |
| 6,853,973 B2 | 2/2005 | Mathews et al. |
| 7,010,492 B1 | 3/2006 | Bassett et al. |
| 7,068,189 B2 | 6/2006 | Brescia |
| 7,142,874 B1 * | 11/2006 | Oleniczak ................. 455/456.3 |
| 7,149,549 B1 | 12/2006 | Ortiz et al. |
| 7,158,798 B2 | 1/2007 | Lee et al. |
| 7,200,658 B2 | 4/2007 | Goeller et al. |
| 7,376,388 B2 | 5/2008 | Ortiz |

| | | | |
|---|---|---|---|
| 7,450,930 B2 | 11/2008 | Williams | |
| 7,486,943 B2* | 2/2009 | Choti et al. | 455/404.2 |
| 7,796,162 B2 | 9/2010 | Ortiz | |
| 7,826,877 B2 | 11/2010 | Ortiz | |
| 7,929,954 B2 | 4/2011 | Choti et al. | |
| 8,213,898 B2* | 7/2012 | Choti et al. | 455/404.2 |
| 2001/0022558 A1 | 9/2001 | Karr et al. | |
| 2002/0023010 A1* | 2/2002 | Rittmaster et al. | 705/26 |
| 2002/0063799 A1 | 5/2002 | Ortiz | |
| 2002/0072984 A1* | 6/2002 | Rothman et al. | 705/26 |
| 2002/0090985 A1 | 7/2002 | Tochner et al. | |
| 2002/0138385 A1 | 9/2002 | Milam | |
| 2002/0143991 A1 | 10/2002 | Chow et al. | |
| 2003/0036949 A1 | 2/2003 | Kaddeche et al. | |
| 2003/0074471 A1 | 4/2003 | Anderson et al. | |
| 2003/0112354 A1 | 6/2003 | Ortiz | |
| 2003/0187949 A1 | 10/2003 | Bhatt | |
| 2003/0191964 A1 | 10/2003 | Satyavolu | |
| 2004/0010566 A1 | 1/2004 | Monteverde | |
| 2004/0024682 A1* | 2/2004 | Popovitch | 705/37 |
| 2004/0047287 A1 | 3/2004 | Tremblay | |
| 2004/0068582 A1 | 4/2004 | Anderson et al. | |
| 2004/0078367 A1 | 4/2004 | Anderson et al. | |
| 2004/0078489 A1 | 4/2004 | Anderson et al. | |
| 2004/0078490 A1 | 4/2004 | Anderson et al. | |
| 2004/0083133 A1* | 4/2004 | Nicholas et al. | 705/14 |
| 2004/0267906 A1* | 12/2004 | Truty | 709/219 |
| 2005/0071417 A1 | 3/2005 | Taylor et al. | |
| 2005/0216555 A1 | 9/2005 | English et al. | |
| 2006/0058037 A1 | 3/2006 | Kenyon | |
| 2006/0135174 A1 | 6/2006 | Kraufvelin et al. | |
| 2007/0076872 A1* | 4/2007 | Juneau | 380/202 |
| 2008/0275978 A1* | 11/2008 | Houri | 709/223 |

OTHER PUBLICATIONS

"A Review of the Copyright Licensing Regimes Covering Retransmission of Broadcast Signals", published by the U.S. Copyright Office, Aug. 1, 1997; 160 pgs.
Baoding Hsieh Fan, "When Channel Surfers Flip to the Web: Copyright Liability for Internet Broadcasting", 52 FED.COMM. L.J. 619, 629, 2000, 28 pgs.
Edward O. Fritts, prepared statement for the Housing Judiciary Hearing on "Copyrighted Webcast Programming On The Internet", Jun. 15, 2000, 8 pgs.
Ex Partes Reexamination Request Under 35 USC 311-318 and 37 CFR 1.913, 1.915 and 1.919; US Patent No. 7,486,943; Dec. 22, 2011; 45 pgs.
Ex Parte Reexamination Certificate received in U.S. Reexamination Control No. 90/009,979, for U.S. Patent No. 7,486,943, mailed Oct. 22, 2012 (2 pages).
Ex Parte Reexamination Certificate received in U.S. Reexamination Control No. 90/012,391, for U.S. Patent No. 7,929,954, mailed Jan. 24, 2013 (2 pages).
Ex Parte Reexamination Final Office Action received in U.S. Reexamination Control No. 90/009,979, for U.S. Patent No. 7,486,943, mailed Jun. 1, 2012 (26 pages).
Ex Parte Reexamination Notice of Intent to Issue a Reexamination Certificate received in U.S. Reexamination Control No. 90/009,979, for U.S. Patent No. 7,486,943, mailed Sep. 12, 2012 (12 pages).
Ex Parte Reexamination Notice of Intent to Issue Ex Parte Reexamination Certificate received in U.S. Reexamination Control No. 90/012,391, for U.S. Patent No. 7,929,954, mailed Jan. 4, 2013 (12 pages).
Ex Parte Reexamination Office Action received in U.S. Reexamination Control No. 90/009,979, for U.S. Patent No. 7,486,943, mailed Feb. 10, 2012 (23 pages).
Ex Parte Reexamination Order Granting/Denying Request for Ex Parte Reexamination received in U.S. Reexamination Control No. 90/009,979, for U.S. Patent No. 7,486,943, mailed Feb. 10, 2012 (27 pages).
Final Office Action received in U.S. Appl. No. 11/012,889 mailed Jan. 11, 2007 (15 pages).
Final Office Action received in U.S. Appl. No. 11/012,889 mailed Nov. 14, 2007 (17 pages).
Non-Final Office Action received in U.S. Appl. No. 11/012,889 mailed Aug. 30, 2006 (15 pages).
Non-Final Office Action received in U.S. Appl. No. 13/088,843 dated Sep. 12, 2011 (19 pages).
Non-final Office Action received U.S. Appl. No. 11/012,889 mailed Jun. 5, 2007 (13 pages).
Notice of Allowance issued in U.S. Appl. No. 12/362,834 mailed Dec. 17, 2010 (10 pages).
Notice of Allowance issued in U.S. Appl. No. 13/088,843 mailed Mar. 2, 2012 (22 pages).
Notice of Allowance received in U.S. Appl. No. 11/012,889 mailed Oct. 2, 2008 (9 pages).
Ververidis, C. et al., "Mobile Marketing Using a Location Based Service," Proceedings of the First International Conference on Mobile Business, Athens, Greece (2002), 12 pages.
Mar. 10, 2004, "RealNetworks, Inc. v. MLB Advanced Media, L.P.", Case No. 2:04-cv-00511 in the U.S. Federal Court For the Western District of Washington, Complaint.
David Sweet, "Baseball Webcasts are sign of things to come," Sports Business Journal, Oct. 21, 2002, 2 pages.
Russell Adams, "Real offers package of NFL audio/video" < Sports Business Journal, Aug. 25, 2003, 1 page.
K. Harrenstien, IETF RFC 952, "DOD Internet Host Table Specification", published Oct. 1985, 6 pages.
P. Mockapetris, IETF RFC 1034, "Domain Names—Concepts and Facilities", published 1987, 55 pages.
C. Davis, IETF RFC 1876, "A Means for Expressing Location Information in the Domain Name System", published Jan. 1996.
D. Eastlake, IETF RFC 3106, "ECML v1.1: Field Specifications for E-Commerce", published Apr. 2001, 20 pages.
Jun. 30, 2004, "RealNetworks, Inc. v. MLB Advanced Media, L.P.", Case No. 2:04-cv-0051, MLB initial disclosures.

* cited by examiner

*Primary Examiner* — Inder Mehra
(74) *Attorney, Agent, or Firm* — Foley & Lardner LLP

(57) ABSTRACT

A method of limiting presentation of rules based events includes receiving a request to view a rules based event at a computer. A first estimate of a first geographic location of the computer is obtained. The first estimate includes a first confidence determination. If the first confidence determination is less than a first established confidence level, a second estimate of the first geographic location of the computer is obtained. The second estimate includes a second confidence determination for comparison to a second established confidence level. The first estimate and the second estimate define a composite estimated geographic location of the computer. Information on a second geographic location of the rules based event is retrieved. The retrieved information is compared with the composite estimated geographic location of the computer. Access to the rules based event is provided based on access rules, the comparison, and the composite estimated geographic location.

23 Claims, 9 Drawing Sheets

SYSTEM FOR VERIFYING ACCESS BASED ON A DETERMINED GEOGRAPHIC LOCATION OF A SUBSCRIBER OF A SERVICE PROVIDED VIA A COMPUTER NETWORK

CROSS-REFERENCE TO RELATED PATENT APPLICATIONS

This application is a Continuation of U.S. application Ser. No. 13/088,843, filed Apr. 18, 2011, now U.S. Pat. No. 8,213, 898, incorporated herein by reference in its entirety, which is a Continuation of U.S. application Ser. No. 12/362,834, filed Jan. 30, 2009, now U.S. Pat. No. 7,929,954, incorporated herein by reference in its entirety, which is a Divisional of U.S. application Ser. No. 11/012,889, filed Dec. 15, 2004, now U.S. Pat. No. 7,486,943, incorporated herein by reference in its entirety.

BACKGROUND OF THE INVENTION

1. Field of the Invention

The present invention relates generally to systems and techniques for verifying access to a network based on geographic location of a network entity, such as a node coupled to the Internet. More particularly, the present invention relates to a system and method for verifying access by determining the geographic location of a subscriber of a service provided over a computer network, such as the Internet.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

Information concerning the geographic location of a networked entity, such as a network node, may be useful for any number of reasons. Geographic information may be utilized by network-based content distribution systems as part of a Digital Rights Management (DRM) program or an authorization process to determine whether particular content may validly be distributed to a certain network location. For example, in terms of a broadcast or distribution agreement, certain content may be blocked from distribution to certain geographic areas or locations. This could apply to educational content as well, in the case of paid college courses which, are offered online, but have restrictions based on location. Geographic location information may also be utilized to infer demographic characteristics of a network user. Accordingly, geographic information may be utilized to direct advertisements or offer other information via a network that has a higher likelihood of being the relevant to a network user at a specific geographic location. In addition, geographic location information may be utilized by network-based sweepstakes, contests, promotions and fantasy games, as part of an authorization process to determine whether a particular participant is eligible to participate. Finally, geographic location information may also be utilized by network-based goods or services distribution systems as part of a management program or authorization process to determine whether particular goods or services, including but not limited to promotions of such goods or services, may be validly distributed to a certain network or physical location, as well as enabling such distributor to apply factors which vary according to location, such as price. An example of this is in the case of pharmaceutical companies who may distribute their products worldwide, but charge different prices based on location or due to legal restrictions are not permitted to sell certain medications in certain countries.

Content delivered to a specific network entity, at a known geographic location, may also be customized according to the known geographic location. For example, localized news, weather, and events listings may be targeted at a network entity where the geographic location of the networked entity is known. Furthermore content may be presented in a local language and format. Knowing the location of network entity can also be useful in combating fraud. For example, where a credit card transaction is initiated at a network entity, the location of which is known and far removed from a geographic location associated with an owner of credit card, a credit card fraud check may be initiated to establish the validity of the credit card transaction.

U.S. Pat. No. 6,629,136 entitled "System and method for providing geographically-related content over a network" describes automatic delivery of localized information and/or services via the Internet without using information entered by a user (e.g., a ZIP code, city name). The system described in the patent obtains location information using a geocoder, such as a GPS device. The patent specifically identifies notices of local events and sports as types of localized information that can be delivered.

U.S. Pat. No. 6,665,715 entitled "Method and systems for locating geographical locations of online users" describes a system for identifying geographical locations of on-line users and creating a database with IP addresses and corresponding geographical locations of each IP address. The location tracking system described includes a tracing engine module that sends a route identification command to all the end-users who are currently on-line. In response to the route identification command, the tracing engine module receives IP address numbers of all intermediary host computers that were employed in the route that dynamically connects the location tracking system to each of the end users. The location tracking system then obtains the geographical location of each end user that is currently on-line, based on the prior information that the user had provided.

Geolocation software is described in U.S. Pat. No. 6,684, 250 entitled "Method and apparatus for estimating a geographic location of a networked entity" and assigned on the face of the patent to Quova, Inc. of Mountain View, Calif. (the "Quova patent"). The Quova patent describes a method to estimate a geographic location associated with a network address includes performing a data collection operation to obtain information pertaining to a network address. The retrieved information is processed to identify a plurality of geographic locations potentially associated with the network address, and to attach a confidence factor to each of the plurality of geographic locations. An estimated geographic location is selected from the plurality of geographic locations as being a best estimate of a true geographic location of the network address, where the selection of the estimated geographic location is based upon a degree of confidence-factor weighted agreement within the plurality of geographic locations.

There is a need to have improved determination of the geographic location of a network entity. Further, there is a need to assess the conditions of use that should be subjected to a subscriber of an Internet service based on the geographic location of the subscriber. Even further, there is a need to improve the accuracy of determining geographic location to comply with various restrictions and/or terms and conditions, based on the geographic location of computer users, including but not limited, to (i) limiting the presentation of live and non-live events based on the geographic location of computer users attempting to view such events due to geographic restrictions pertaining to the distribution of such events ("rules based events"), (ii) entering computer users via online methods, into various sweepstakes, contests, promotions and fantasy games, (iii) limiting the sales of goods and services sold or provided online based on the location of computers users attempting to purchase the goods and/or services; and (iv) applying varying rules, such as price, to the sale of good and/or services sold online based on the location of the customer. There is also a need to improve the efficiency and cost of a company's marketing abilities online by better enabling targeted advertisements and promotions based on location of the user.

SUMMARY OF THE INVENTION

One exemplary embodiment relates to a system for verifying access to a network based on geographic location of a subscriber of a service provided over a computer network. The system can be applied to a variety of situations. For example, a rules based events system can include a subscriber computer physically located in a geographic location, a service computer providing a subscription service to the subscriber computer via a network where the subscription service is limited based on the geographic location of the subscriber computer, and an event interface coupled to the service computer. The event interface receives rules based event information, either as the event is occurring or as it is being requested, as applicable, depending on whether such rules based event is a live or non-live event, and the subscription service communicates event information to the subscriber computer as the event is occurring or as it is being requested, as applicable. The service computer verifies access by the subscriber computer to the subscription service based on the geographic location of the subscriber computer. The geographic location of the subscriber computer is estimated using a first estimation process and, if the first estimation process produces an estimate having a confidence level below a determined threshold, a second estimation process.

In other implementations, online sweepstakes, contests, fantasy games, and other promotions systems can include a subscriber computer physically located in a geographic location, a service computer providing entry to the entrant's computer via a network where such entry is limited based on the geographic location of the subscriber computer, and an interface coupled to the service computer. The interface for such promotions receives rule information as the participant is entering, and the subscription service communicates entry information to the subscriber computer as the entry is occurring. The service computer verifies access by the subscriber computer to entry based on the geographic location of the subscriber computer. The geographic location of the subscriber computer is estimated using a first estimation process and, if the first estimation process produces an estimate having a confidence level below a determined threshold, a second estimation process.

In other implementations, online sale of goods and/or services systems can include a subscriber computer physically located in a geographic location, a service computer providing the sale of goods and/or services online to the subscriber computer via a network where either restrictions exist and/or varying conditions have been set for such goods and/or services, such as price, regarding the sale of such goods and/or services online based on the geographic location of the subscriber computer, and an interface coupled to the service computer. The interface receives sale information as the order is being placed, and the subscription service communicates sales related information to the subscriber computer as the order is being placed. The service computer verifies compliance with conditions and restrictions of the sale by the subscriber computer based on the geographic location of the subscriber computer. The geographic location of the subscriber computer is estimated using a first estimation process and, if the first estimation process produces an estimate having a confidence level below a determined threshold, a second estimation process.

In yet another implementation, a targeted online marketing system can include a subscriber computer physically located in a geographic location, a service computer providing a subscription service to the subscriber computer via a network where the marketing is targeted to, and tailored, based on the geographic location of the subscriber computer, and an interface coupled to the service computer. The interface receives marketing information as the subscriber is subscribing to the service, and the subscription service communicates marketing information to the subscriber computer as the subscriber is subscribing to a service. The service computer provides marketing information based on the geographic location of the subscriber computer and allows a company to tailor marketing efforts to subscribers in a certain area or send location specific advertisements online based on the location of the subscriber computer, thereby increasing efficiency and maximizing costs of marketing efforts. The geographic location of the subscriber computer is estimated using a first estimation process and, if the first estimation process produces an estimate having a confidence level below a determined threshold, a second estimation process.

Another exemplary embodiment relates to a method of setting limitations based on the geographic location of computer users attempting to access a feature through a network. The method can apply to a variety of situations. For example, a rules based events method can limit the presentation of rules based events based on the geographic location of computer users attempting to view the event via a network. The method includes receiving over a network a request to view a rules based event at a computer, obtaining a first estimate of geographic location of the computer where the first estimate of geographic location includes a first confidence determination, and obtaining a second estimate of geographic location of the computer if the first confidence determination is less than an established confidence level. The first and second estimates of geographic location define a composite estimated geographic location of the computer. The method further includes retrieving information on a geographic location for a rules based event, comparing the retrieved information on the geographic location of the rules based event with the composite estimated geographic location of the computer, and providing access to the rules based event based on access rules and the comparison of the retrieved information on the geographic location of the rules based event and the estimated geographic location of the computer.

In other implementations, online sweepstakes, contests, fantasy games, and other promotion methods can limit access to online promotions based on the geographic location of computer users attempting to enter the promotion via a network. The methods include receiving over a network a request to enter a promotion at a computer, obtaining a first estimate of geographic location of the computer where the first estimate of geographic location includes a first confidence determination, and obtaining a second estimate of geographic location of the computer if the first confidence determination is less than an established confidence level. The first and second estimates of geographic location define a composite estimated geographic location of the computer. The methods further include retrieving information relevant to the geographic restrictions for the promotions ("promotional information"), comparing the retrieved promotional information with the composite estimated geographic location of the computer, and providing access to enter such promotions based on access rules and the comparison of the retrieved promotional information and the estimated geographic location of the computer.

In other implementations, online sale of goods and/or services methods limit the sale of goods and/or services sold online or applying varying rules which change, such as price, based on the geographic location of computer users attempting to purchase the goods and/or services via a network. The methods include receiving over a network a request to purchase goods and/or services at a computer, obtaining a first estimate of geographic location of the computer where the first estimate of geographic location includes a first confidence determination, and obtaining a second estimate of geographic location of the computer if the first confidence determination is less than an established confidence level. The first and second estimates of geographic location define a composite estimated geographic location of the computer. The methods further include retrieving geographic information relevant to geographic restrictions and/or varying rules ("sale rules") specific to the sale of goods and/or services online based on geographic location ("sale information"), comparing the retrieved sale information relevant to the geographic restrictions and/or sale rules with the composite estimated geographic location of the computer, and allowing the sale of such goods and/or services only to a permitted location and/or applying the applicable sale rules to such location based on access rules and/or sale rules and the comparison of the retrieved sale information and the estimated geographic location of the computer.

In yet another implementation, a targeted online marketing method includes targeting marketing to, and tailoring marketing towards, a subscriber based on the geographic location of the subscriber computer. The method includes receiving over a network a request to subscribe or obtain access to a service at a computer, obtaining a first estimate of geographic location of the computer where the first estimate of geographic location includes a first confidence determination, and obtaining a second estimate of geographic location of the computer if the first confidence determination is less than an established confidence level. The first and second estimates of geographic location define a composite estimated geographic location of the computer. The method further includes retrieving information for the marketing effort relating to, limiting which subscribers receive certain promotions and/or tailoring such marketing efforts, based on the location of the subscriber computer ("marketing information"), comparing the retrieved marketing information with the composite estimated geographic location of the computer, and providing marketing efforts and/or specially tailored marketing based on the rules assigned to govern where a marketing effort will be sent and/or how it will be tailored depending on the geographic location of the user ("marketing rules") and the comparison of the retrieved marketing information and the estimated geographic location of the computer.

Another exemplary embodiment relates to a method of determining the geographic location of a subscriber of a service provided over a computer network. The method can apply to a variety of situations. For example, a rules based events method can include obtaining a first estimate of geographic location of a subscriber computer where the first estimate of geographic location includes a first confidence factor. The method further includes performing an address verification operation if the first confidence factor does not exceed a first threshold. The address verification operation results in a second estimate of geographic location of the subscriber computer where the second estimate of geographic location includes a second confidence factor. The method includes either applying blackout rules or other geographic restrictions, as applicable, to the subscriber computer based on a rules based event selected at the subscriber computer and the first estimate of geographic location, if the first confidence factor exceeds the first threshold, or the second estimate of geographic location, if the second confidence factor exceeds a second threshold and the first confidence factor does not exceed the first threshold.

In other implementations, online sweepstakes, contests, fantasy games, and other promotion methods can include obtaining a first estimate of geographic location of a subscriber computer where the first estimate of geographic location includes a first confidence factor. The methods further include performing an address verification operation if the first confidence factor does not exceed a first threshold. The address verification operation results in a second estimate of geographic location of the subscriber computer where the second estimate of geographic location includes a second confidence factor. The methods include applying entry rules based on location, to the subscriber computer for a promotion selected at the subscriber computer and the first estimate of geographic location, if the first confidence factor exceeds the first threshold, or the second estimate of geographic location, if the second confidence factor exceeds a second threshold and the first confidence factor does not exceed the first threshold.

In another implementation, an online sale of goods and/or services method includes obtaining a first estimate of geographic location of a subscriber computer where the first estimate of geographic location includes a first confidence factor. The method further includes performing an address verification operation if the first confidence factor does not exceed a first threshold. The address verification operation results in a second estimate of geographic location of the subscriber computer where the second estimate of geographic location includes a second confidence factor. The method includes applying geographic restrictions and/or sale rules to the subscriber computer based on the goods and/or services selected at the subscriber computer and the first estimate of geographic location, if the first confidence factor exceeds the first threshold, or the second estimate of geographic location, if the second confidence factor exceeds a second threshold and the first confidence factor does not exceed the first threshold.

In yet another implementation, a targeted online marketing method includes obtaining a first estimate of geographic location of a subscriber computer where the first estimate of geographic location includes a first confidence factor. The method further includes performing an address verification operation if the first confidence factor does not exceed a first threshold. The address verification operation results in a second estimate of geographic location of the subscriber computer where the second estimate of geographic location includes a second confidence factor. The method includes applying marketing rules to various marketing efforts targeted and/or tailored and sent to the subscriber computer based on the location of the subscriber computer and the first estimate of geographic location, if the first confidence factor exceeds the first threshold, or the second estimate of geographic location, if the second confidence factor exceeds a second threshold and the first confidence factor does not exceed the first threshold.

DETAILED DESCRIPTION OF EXEMPLARY EMBODIMENTS

Figure 1:
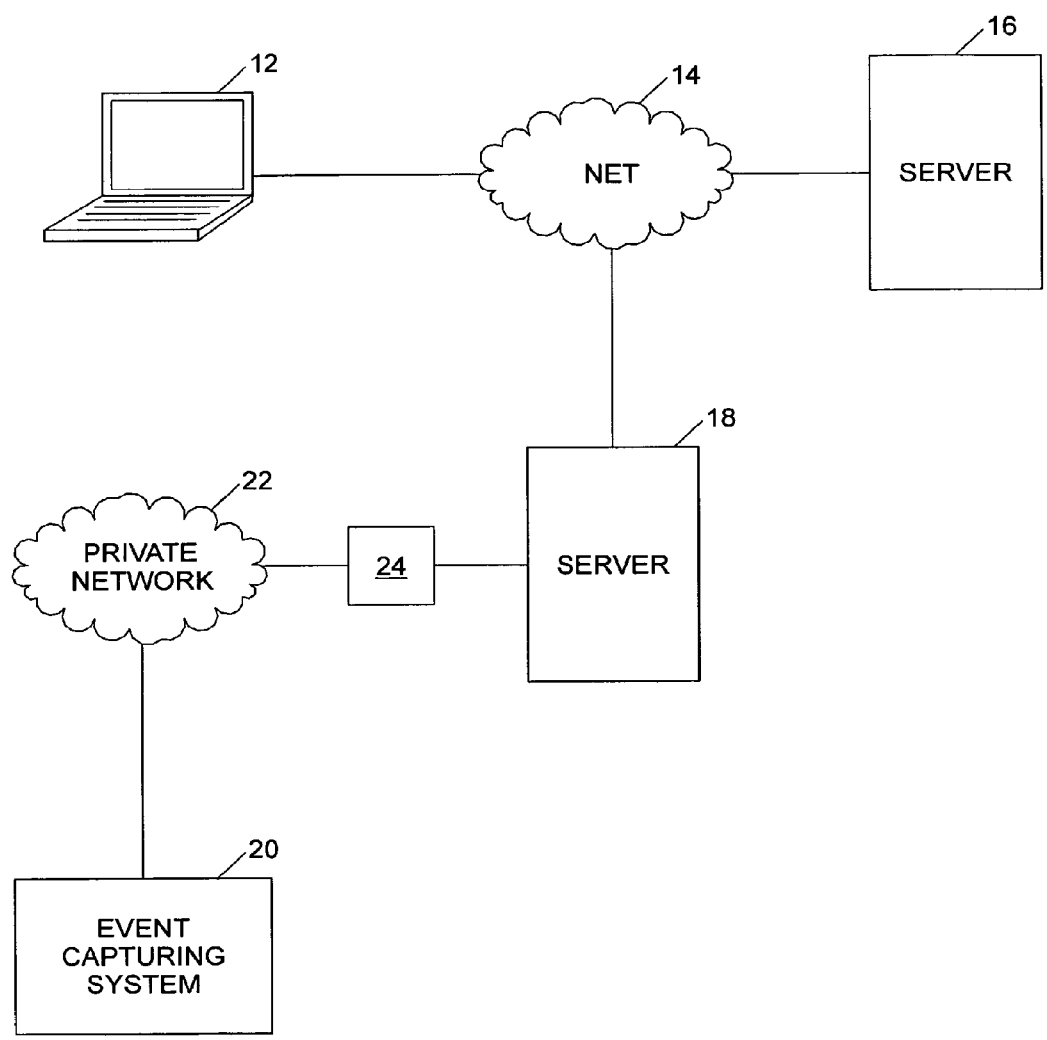
FIG. 1 is a general diagram depicting a system enabling a subscriber to view rules based events communicated via a network in accordance with an exemplary embodiment.

FIG. 1 illustrates a system enabling a subscriber to view rules based events communicated via a network, such as the Internet. The event can be a musical performance, a sporting event, an entertainment production, or any other activity that may have a subscriber audience. In an exemplary embodiment, a subscriber uses a computer 12 communicatively coupled to a network 14 to send and receive communications. The network 14 can be the Internet. The computer 12 can receive communications from servers 16 and 18 that are also a coupled to the network 14. The server 18 can communicate an event, including video, audio, or data it receives from an event capturing system 20 via a network 22. The network 22 can be a private network, such as a satellite network or a television network. The server 18 receives event information via an interface 24. The interface 24 can be software or hardware or a combination of both. Preferably, the computer 12 is a personal computer or computer workstation, but, alternatively, the computer 12 can be a cell phone, personal digital assistant (PDA), or any of a variety of other devices.

By way of example, the event capturing system 20 can include one or more audio and video capturing devices that capture audio and/or video at an event, such as a music concert or a sporting match. The event capturing system 20 can also include devices to capture data associated with the event, such as scores, attendance, game clock, and other information. A range of different capturing techniques and formats can be utilized by the event capturing system 20. The event capturing system 20 can be a television system that is capturing the event for broadcast over network, cable, or satellite television networks. The server 18 can provide the event communication to the computer 12 either as a rules based event or a non-rules based event, where no geographical restrictions exist pertaining to such event.

The system is designed to determine if a customer can view a specific event based on the customer's geographical location. Viewing rights may be restricted due to legal rights owned by various parties who have rights as to the broadcast of the rules based event. These restrictions may be imposed at multiple levels of local restrictions, national restrictions, and international restrictions. By way of further example, that may overlap with each other. In the familiar setting of sporting events, games may not be broadcast to persons located in a geographical area proximate the event. Such games may be "blacked out" from view by local audiences if tickets are still available for purchase to attend the event in person. A variety of reasons may drive such restrictions. Or, there may be a music concert for a popular music performer, which may be restricted from live viewing by computer subscribers due to legal restrictions. One advantage of the present system, as set forth below, is that it provides a secure automated system to implement such restrictions.

Figure 2:
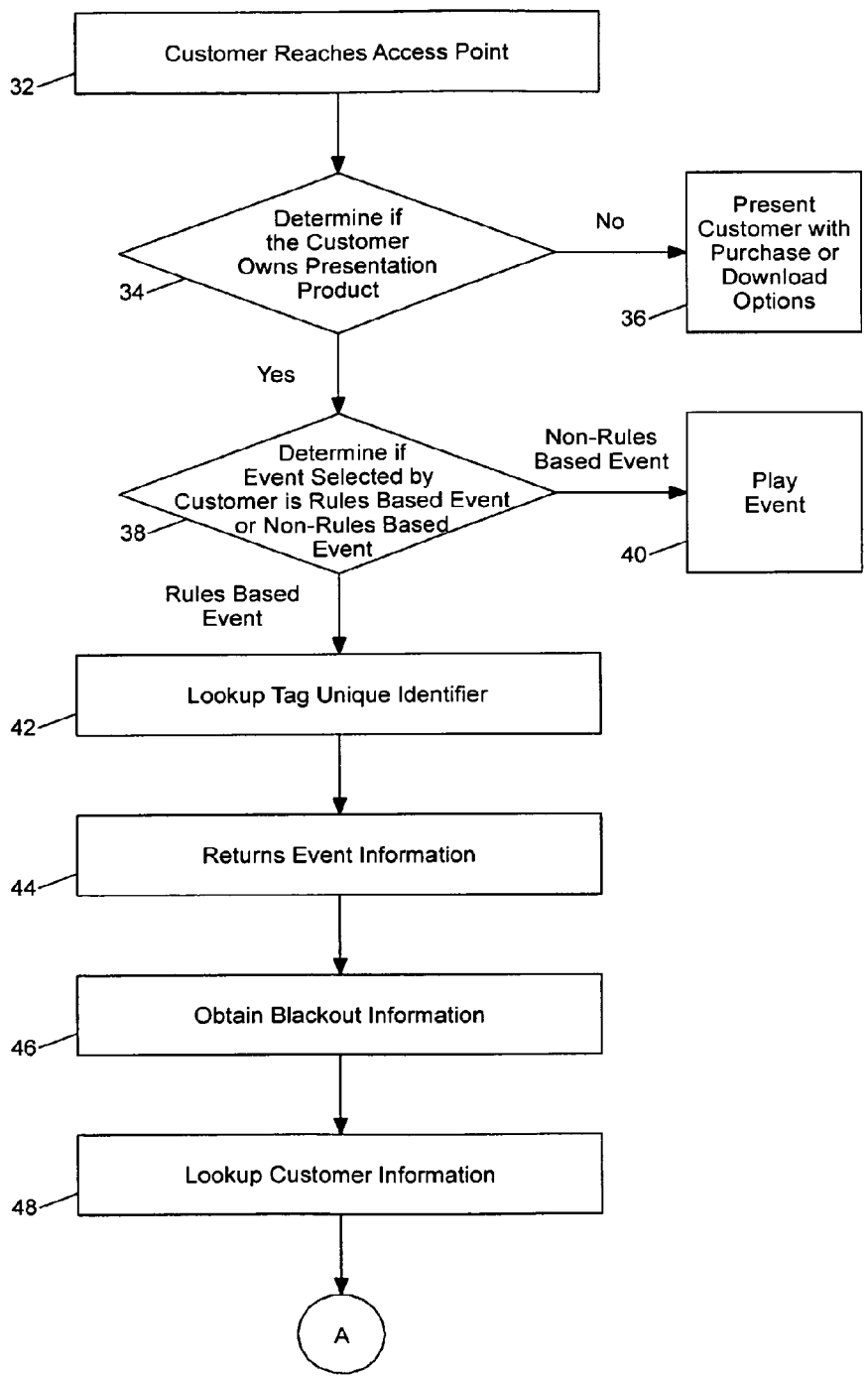
FIG. 2 is a flow diagram depicting operations performed in a process of verifying access based on a determined geographic location of a subscriber of a service provided via a computer network in accordance with an exemplary embodiment.

FIG. 2 illustrates a flow diagram depicting operations in a process of determining geographic location of a subscriber of a service provided via a computer network. Additional, fewer, or different operations may be performed depending on the embodiment. In an operation 32, a customer using a computer reaches an access point, such as a web site on the Internet. The access point may be reached using a web address or link. In an operation 34, a determination is made whether the customer owns a presentation product, which can present the service or communication to be received. A determination can be made automatically by checking the computer system for various files, querying the customer, or referring to customer information within the application. If the customer does not have the presentation product on the computer, the customer is presented with purchase or download options in an operation 36. If the customer does have the presentation product on the computer, a determination is made in an operation 38 as to whether an event selected by the customer is a rules based event or non-rules based event. If the event is non-rules based, an operation 40 is performed in which the non-rules based event is communicated to the customer. The communication of the event can be a download where the entire file is communicated to the subscriber computer or the event can be presented in streaming media where it is presented on the subscriber computer over the network. In some embodiments, the event file is not transferred in its entirety for storage at the subscriber computer. In some embodiments, an event file may be downloaded in its entirety for storage on a subscriber computer and in some of other applications no file is transmitted.

If the event is a rules based event, an operation 42 is performed to look up unique identifier information for the rules based event. In an exemplary embodiment, the unique identifier information is available at the end of a uniform resource locator (URL) of an Internet address. The unique identifier information is associated with a discreet set of rules and can refer to, and is uniquely associated with a set of access rules for viewers of a particular piece of content, such as an event location. For example, in an embodiment where the event is a sporting event, the unique identifier information is a filename that may indicate the "home team," or the team whose hosting the sporting event the unique identifier is a number which corresponds to a database, file or any other source where such information is stored (collectively, the "database"), which may contain more than one piece of information. In general, the home team information provides information on the geographic location of the event and who the opponent is for such event. In non-sports applications, the filename may correspond to a musical group, artist, or act or the venue where the event is held. In an operation 44, event information is returned regarding the event based on the unique identifier information. For example, where the Internet address is url/reflector:60432, the 60432 is parsed out and a database is checked to determine the identity of the teams, performers, or venue corresponding to that number. The database, also points to any other information entered into such database in connection with the unique identifier number, such as whether the event is for display with one media player or another, what the blackout rules are, and what ports are primary and backup for communication.

In an operation 46, blackout information is obtained. The blackout information can be a set of ZIP codes, state codes, country codes, city codes or metropolitan codes of addresses where an event cannot be broadcast on television or Internet because of legal obligations. For example, a baseball game for the New York Yankees may not be viewed by audiences via the internet in the local New York telecast area or in Japan, at any point during the actual game. This condition is commonly referred to as a "blackout" because the television broadcast is either blacked out (i.e. a black screen is presented on broadcast television with no audio) or alternative programming on the broadcast television station is provided. In a sporting event embodiment, in an instance where a unique identifier does not include "away team" information, there is a database query to obtain the current date and determine the away team for that home team and date. The blackout rules associated with the home team and away team for that date are determined. The local rules are generally the same for each game, but national rules may change depending on who has broadcast rights. In an operation 48, customer information is obtained from a database of subscriber information. Customer information can include a residential or billing address. The customer information may also indicate a preferred status for the customer.

Figure 3:
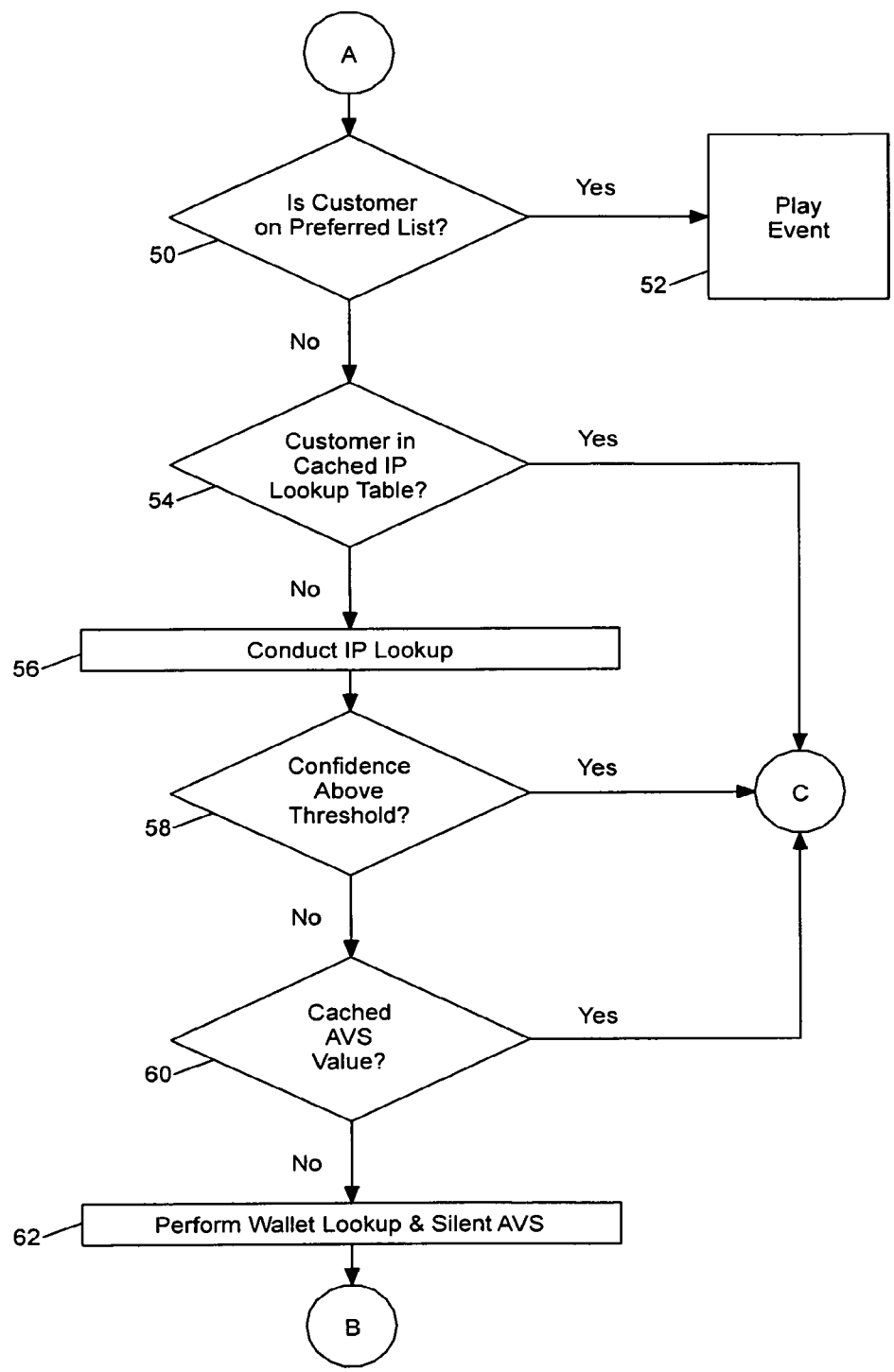
FIG. 3 is a flow diagram depicting further operations in the process of determining geographic location of a subscriber of a service depicted in FIG. 2.

Referring now to FIG. 3, an operation 50 is performed in which a determination is made as to whether the customer is a preferred customer, such as an executive of a sports team or a family member of a team player. If the customer is identified as preferred, an operation 52 is performed in which the rules based event is presented to the customer. If the customer is not identified as preferred, an operation 54 is performed to obtain further customer information, including current geographic location of the customer. In an exemplary embodiment, the system pulls tables out of databases and successively looks for the customer in these tables showing where the customer user has matched with a ruleset previously. A cached IP table can be examined based on user id, such as an e-mail address, which is mapped to a number in the database. The cached IP table contains previously determined IP address information that is updated as the system makes determinations of addresses, locations, and confidence levels. If the current IP address matches the IP address in table, the system can use the already stored county, state, metropolitan area, ZIP code, and routing method with associated confidence levels for each.

If the customer is not in the cached IP look up table, an operation 56 is performed in which a lookup of an internet protocol (IP) address is conducted to determine if the geographic location of the customer can be determined based on the Internet IP address of the customer's computer. In an exemplary embodiment, the IP based lookup is done by geolocation software available from Quova, Inc. of Mountain View, Calif. The geolocation software returns with a confidence rating referencing the level of confidence accompanying the provided location determination. In operation 58, a determination is made as to whether the confidence level of the geographic location determination is above a certain determined threshold level. If the confidence level of the geolocation determination is low, further processing is necessary to determine the geographic location (e.g., zip code, metropolitan area, city, state, country, etc.) of the customer.

If the determination confidence level is not above the threshold, an operation 60 is performed where an Address Verification Service (AVS) cache is checked for customer information. This operation determines an address for user based on credit card number, or any other verifiable payment methods accepted as payment online, including, but not limited to, debit card, e-checks and paypal and billing address for credit card or such other verifiable payment method. In an exemplary embodiment, the lifetime of the cache entry can be the expiration date of the credit card or debit card. If customer information is found in the AVS cache, the AVS cache address is compared with information from the geolocation software to improve confidence in location determination. If the customer information is not in the AVS cache, an operation 62 is performed to find a wallet defined for the customer in a wallet table. The wallet table contains user billing data, such as credit card number, expiration date, billing address, etc. If the customer is in the wallet table, the address in the wallet table is confirmed with a bank or other financial institution governing the applicable payment method.

Figure 4A:
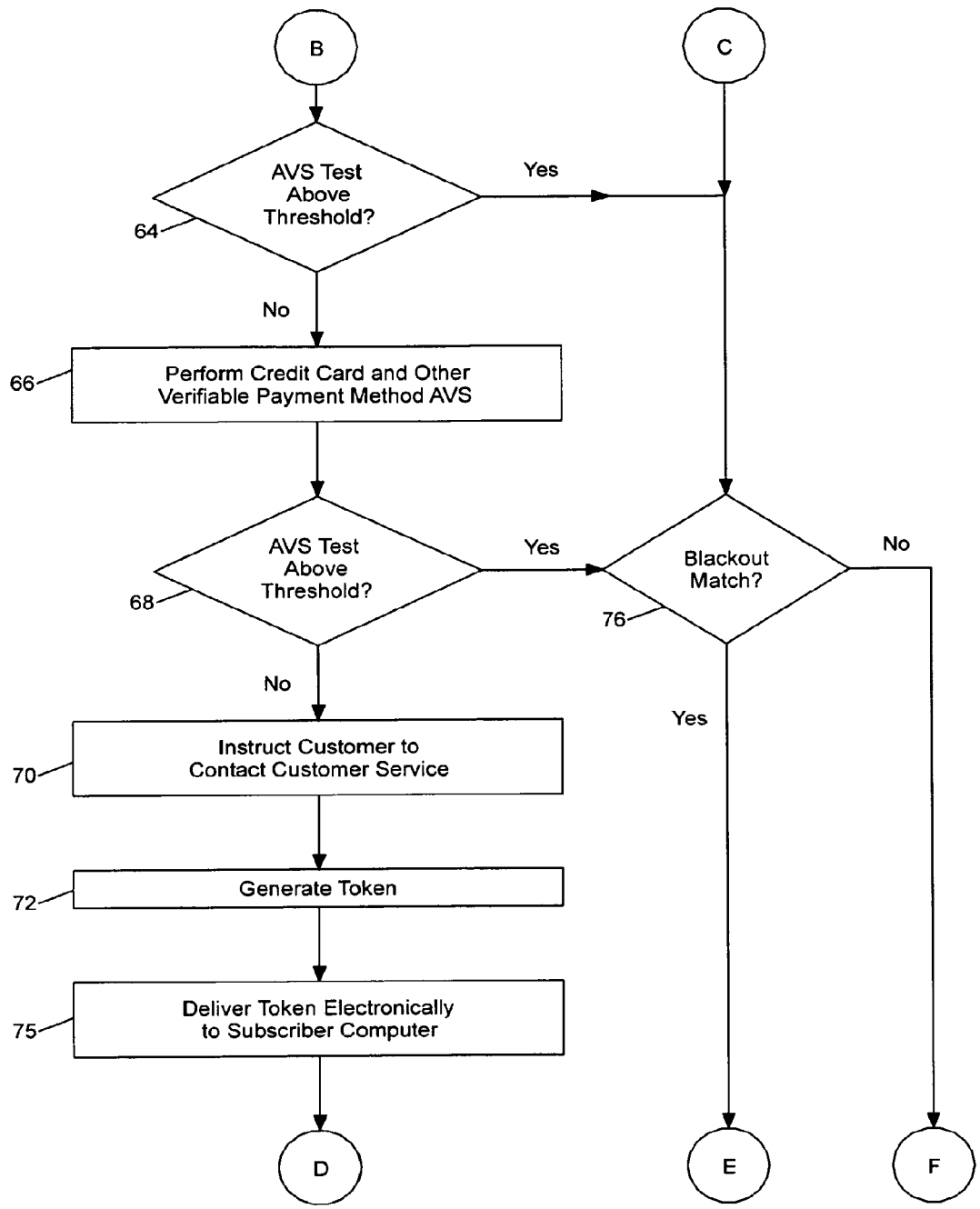
FIG. 4(a) is a flow diagram depicting further operations in the process of determining geographic location of a subscriber of a service depicted in FIG. 2.
Figure 4B:
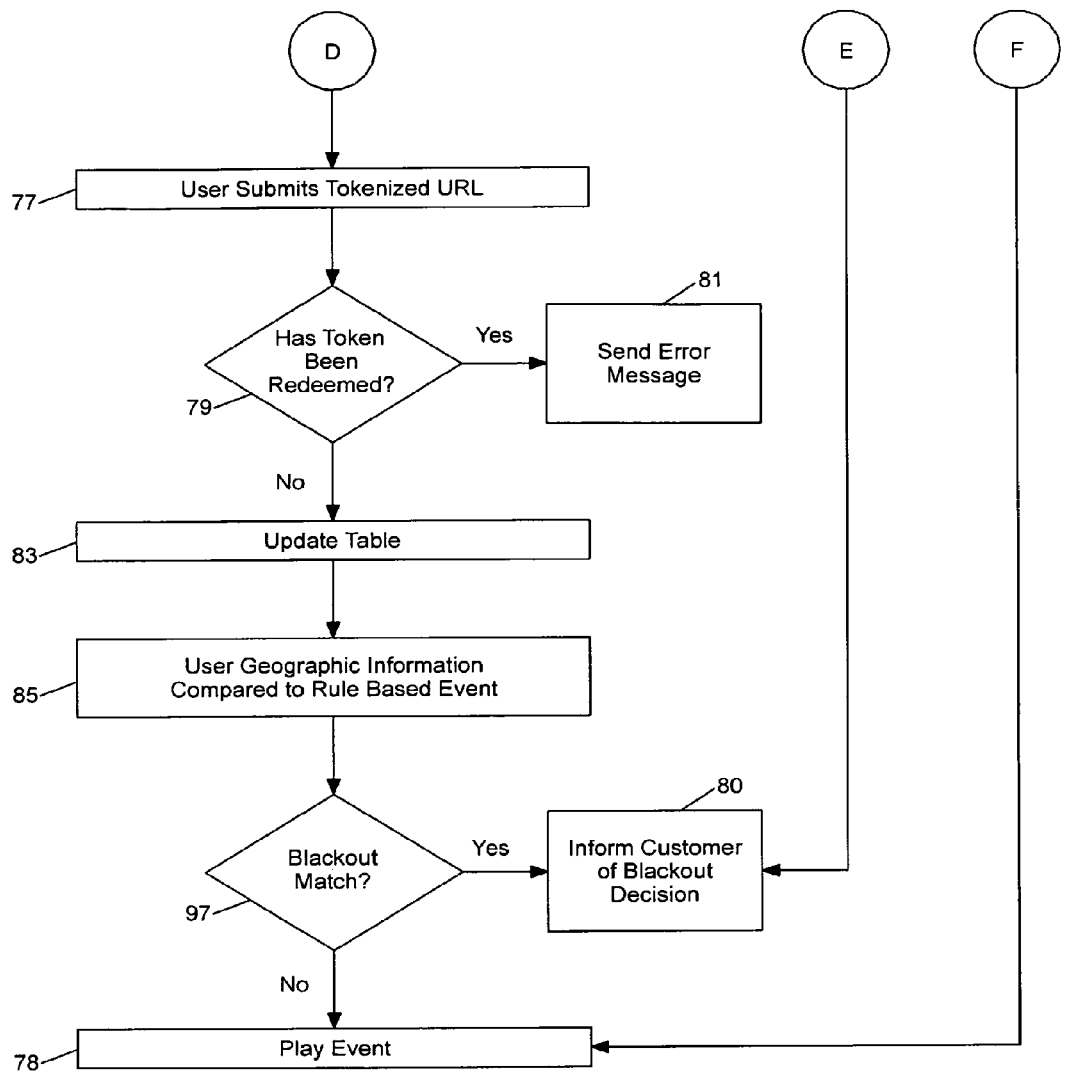
FIG. 4(b) is a flow diagram depicting further operations in the process depicted in FIG. 4(a).

Referring now to FIGS. 4(*a*) and 4(*b*), if customer information is not in the wallet table—that is, if the threshold confidence level is not met in an operation 64, other address verification procedures can be followed in an operation 66, such as looking for registration information when the customer registered a purchased product, previous purchases and other verifiable payment method AVS comparisons. In an operation 68, the confidence level of the geolocation determination based on these procedures is checked against a determined threshold. If the confidence threshold is still not met, an operation 70 is performed in which the customer is instructed to contact customer service by telephone. Customer service preferably asks a series of questions and if customer service can satisfactory ascertain the geographic location of the customer, a unique customer and IP specific token URL is provided to the customer in an operation 72 which is electronically delivered to the user. In operation 75, a token is electronically delivered to the subscriber computer and in operation 77, the user submits the tokenized URL. Once the token is submitted, a test is done in an operation 79 to ensure that the token has not been previously utilized, as a token is only valid for one use. In operation 81 if such token has been redeemed by the customer, an error message is sent and such token cannot be utilized. If such token has not been redeemed the table containing, such information is updated in operation 83 and in operation 85 the users geographic information is compared to the rules based event. In operation 87 if the geographic information of the user violates any geographic restriction for the rules based event then in operation 80 a blackout message is sent to the user. If the geographic information of the user does not match any geographic restrictions for the rules based event then the token URL directs the customer to an Internet location where the rules based event can be accessed. In an operation 74, a customer table is updated with the information obtained during the address verification processes. In an exemplary embodiment, the cached IP table is updated with the additional information from the address verification processes after a confirmation process is performed.

If the customer is found in the cached IP lookup (operation 54 in FIG. 3), if the confidence threshold level is met (operation 58 in FIG. 3), or if other verification methods satisfy confidence level thresholds, a blackout determination is made in an operation 76. If the geographic location information determined for a customer satisfies the blackout restrictions, meaning the rules based event is not blacked out for the customer, the rules based event is presented to the customer in an operation 78. In as much as the event is live, the presentation of the event is provided as the event is going on. However, a small delay may be included (e.g., 10 seconds) for technical or legal reasons. Otherwise, in the case of a non-live event, the presentation of the event is provided as soon as this verification of location is completed and is provided for as long as such non-live event is contained in the recording of the requested event. If the geographic location information determined for a customer does not satisfy the blackout restrictions, the customer is informed of the blackout decision in an operation 80 and the rules based event is not presented.

Figure 5:
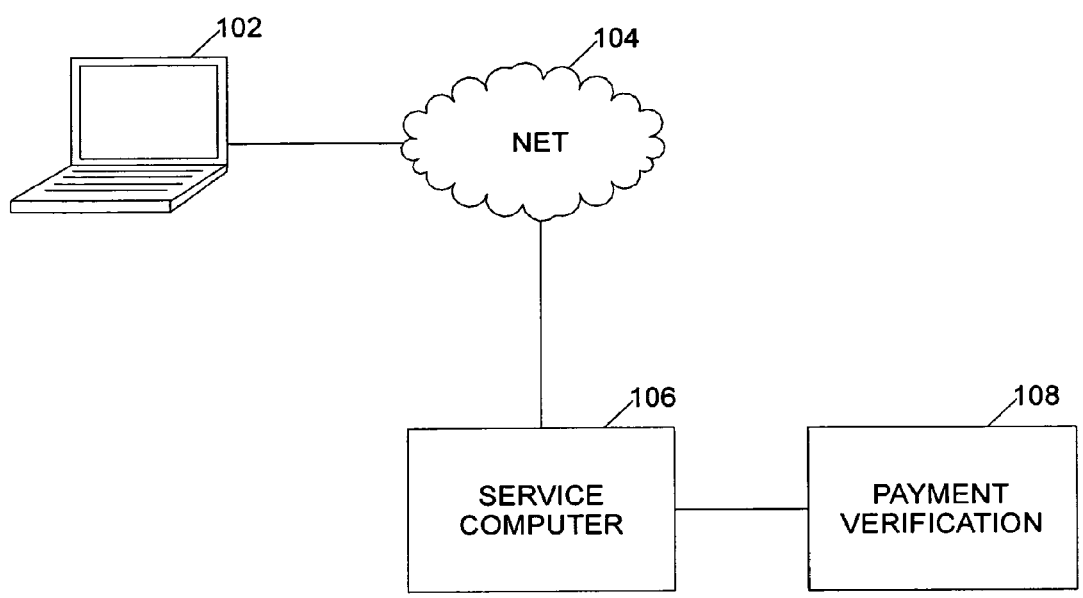
FIG. 5 is a general diagram depicting a system in accordance with other exemplary embodiments.

FIG. 5 illustrates a system including a subscriber computer 102 that is coupled to a network 104 to enable communication with a service computer 106. The service computer 106 can provide an online sweepstakes, contest, fantasy game, or other promotion systems. In an alternative embodiment, the service computer 106 provides for the online sale of goods and/or services. In yet another exemplary embodiment, the service computer 106 provides for targeted marketing information.

The subscriber computer 102 is physically located in a geographic location. In an exemplary embodiment, the service computer 106 receives a computer user's request to enter a promotion, such as a sweepstakes or contest. Such entry may be limited based on the geographic location of the subscriber computer 102. The promotion may also require participants enter a form of payment method which can be verified by a payment verification mechanism 108. The payment verification mechanism 108 can be software, hardware, or a combination of both. The payment verification system 108 can be executed on the service computer 106. The service computer 106 verifies access by the subscriber computer 102 to entry of a promotion based on the geographic location of the subscriber computer 102. The geographic location of the subscriber computer 102 is estimated using a first estimation process and, if the first estimation process produces an estimate having a confidence level below a determined threshold, a second estimation process.

In a situation where the service computer 106 provides for the sale of goods and/or services, restrictions may exist or varying conditions may be set for such goods and/or services, such as price, taxes, shipping charges, etc. The service computer 106 receives sale information when the order is placed by the subscriber computer 102. The service computer 106 verifies compliance with conditions and restrictions of a sale by the subscriber computer based on geographic location of the subscriber computer 102. The geographic location of the subscriber computer 102 is estimated using a first estimation process and, if the first estimation process produces an estimate having a confidence level below a determined threshold, a second estimation process.

In a situation where the service computer 106 is used for a targeted marketing information, marketing is targeted to and prepared for the subscriber computer 102 based on geographic location information. The service computer 106 provides marketing information based on the geographic location of the subscriber computer 102. The service computer 106 allows a company to tailor market efforts to subscribers in a certain area or send location specific advertisements online based on the location of the subscriber computer 102, thereby increasing efficiency and maximizing costs of marketing efforts. The geographic location of the subscriber computer 102 is estimated using a first estimation process and, if the first estimation process produces an estimate having a confidence level below a determined threshold, a second estimation process.

Figure 6:
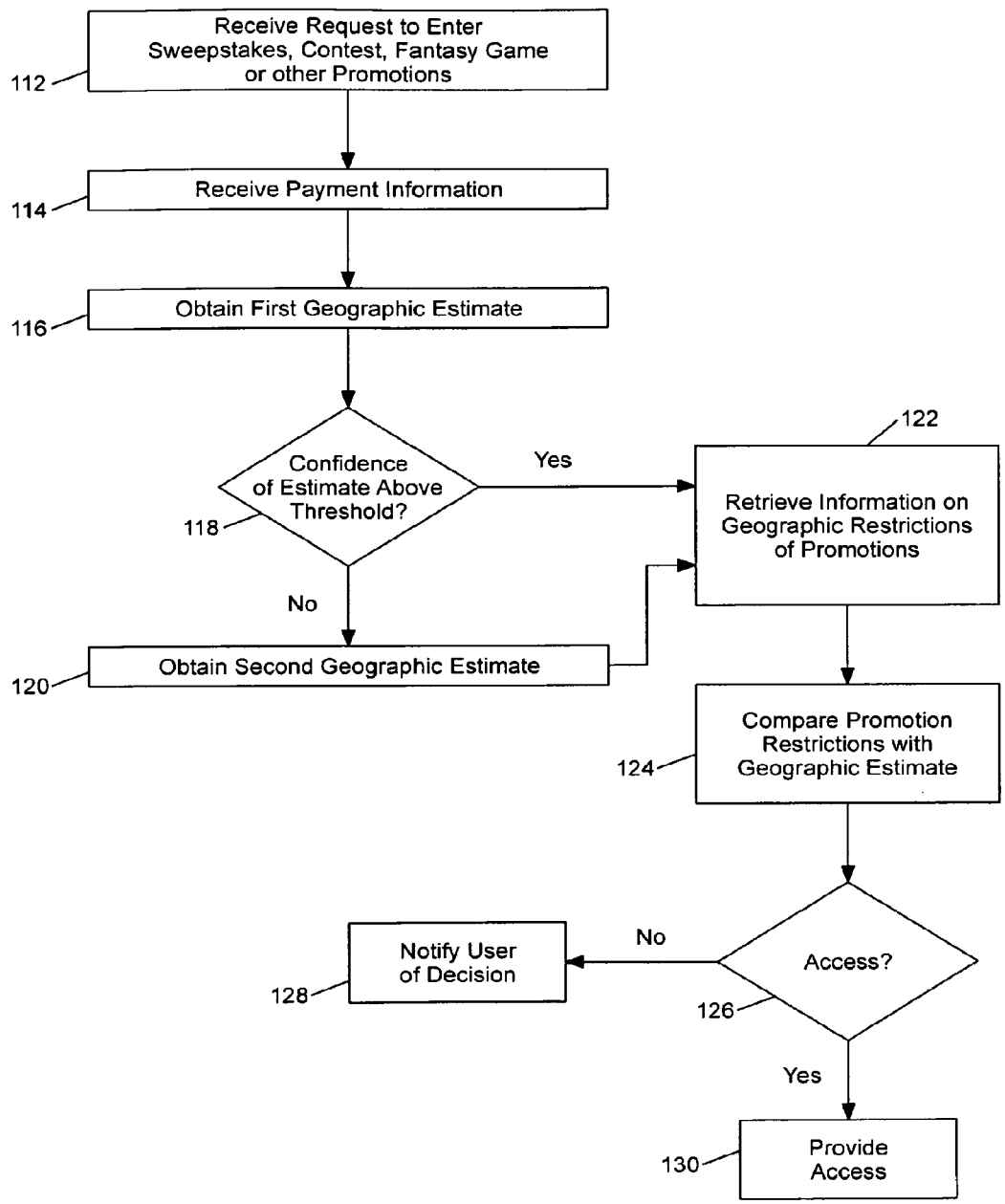
FIG. 6 is a flow diagram depicting operations performed in a process of verifying access based on determined geographic location for an online sweepstakes, contest, fantasy game and other promotions with online entry methods in accordance with an exemplary embodiment.

FIG. 6 illustrates a flow diagram depicting operations in a process of verifying access based on determined geographic location for an online sweepstakes, contest, fantasy game and other promotions with online entry methods. Additional, fewer, or different operations may be performed depending on the embodiment. In an operation 112, a host computer or web server receives a request to enter a promotion or contest from a subscriber computer. In an operation 114, the host computer receives entry information or may receive payment information, such as a credit card, debit card, paypal account number, or other form of payment, which can be used for verification purposes. Payment information can also include an account number associated with a subscriber account. In an operation 116, the host computer obtains a first geographic estimate. This first geographic estimate can be obtained using the processes described with references to FIGS. 1 through 4(a) and (b) above. In an operation 118, a decision is made whether a confidence rating for the first geographic estimate is above a pre-determined threshold. If the confidence in the estimation is not above the threshold, a second geographic estimate is obtained. A variety of processes may be used to obtain this second geographic estimate, including the address verification and other location operations described with reference to FIGS. 1 through 4(a) and (b).

If the first geographic estimate has a confidence level above the pre-determined threshold or after a second geographic estimate is obtained, the host computer retrieves information on geographic restrictions of the promotion in an operation 122. In an operation 124, the host computer compares the promotion restrictions with the determined geographic estimate. In an operation 126, the host computer determines whether access is permitted based on the comparison between the promotion restrictions and the determined geographic estimate. If access is not permitted, an operation 128 is performed in which the user is notified of the decision. If access is permitted, the host computer provides access in an operation 130.

Figure 7:
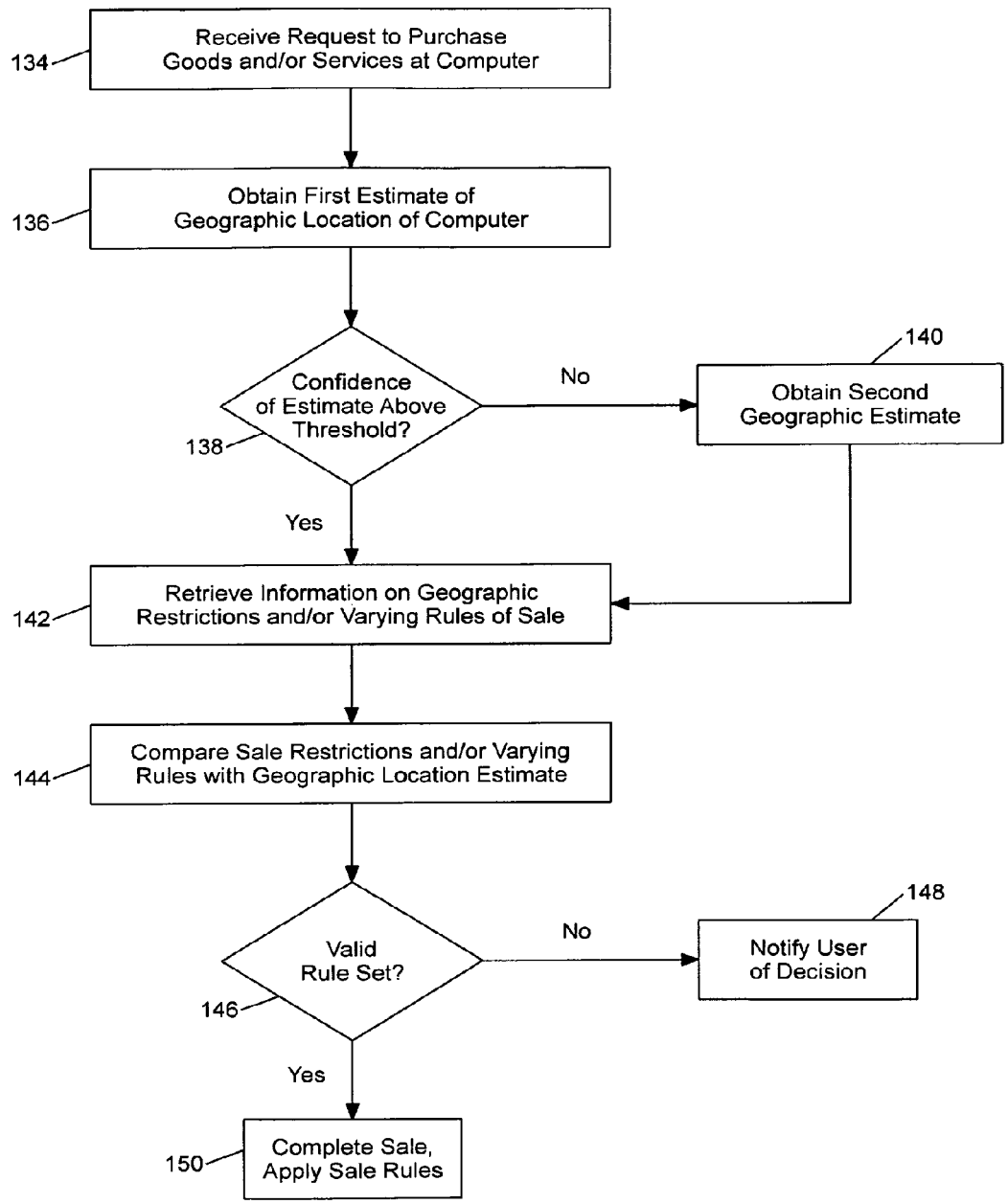
FIG. 7 is a flow diagram depicting operations performed in a process of verifying sale conditions based on geographic location in accordance with an exemplary embodiment.

FIG. 7 illustrates a flow diagram depicting operations in a process of verifying sale conditions or changing sales conditions based on geographic locations. Additional, fewer, or different operations may be performed depending on the embodiment. In an operation 134, a host computer or web server receives a request to purchase goods and/or services from a computer. In an operation 136, the host computer obtains a first estimate of the geographic location of a computer. This first geographic location estimate can be calculated in a similar fashion to the first estimate described with reference to FIGS. 1 through 4(a) and (b). In an operation 138, the host computer determines if the confidence factor provided for the first estimate of the geographic location of the computer is above a pre-determined threshold. If the confidence factor or level is not above the pre-determined threshold, the host computer obtains a second geographic estimate in an operation 140. If the confidence factor is above the threshold or after the second geographic estimate is obtained, the host computer retrieves information on the geographic restrictions of the sale in an operation 142. Geographic restrictions can also apply varying rules to the sales based on location, such as price or other terms. For example, different prices for goods may be presented depending on the geographic location of the customer. In an operation 144, the sale restrictions and/or varying sales rules are compared with the geographic location estimate. In an operation 146, the host computer determines if the sale is valid based on the comparison between sales restrictions and the geographic location estimate. If the sale is not valid, an operation 148 is performed in which the user is notified of the decision. If the sale is valid, an operation 150 is performed in which the sale is completed. The sales are completed by applying sale rules, which may vary depending on the geographic location of the customer.

Figure 8:
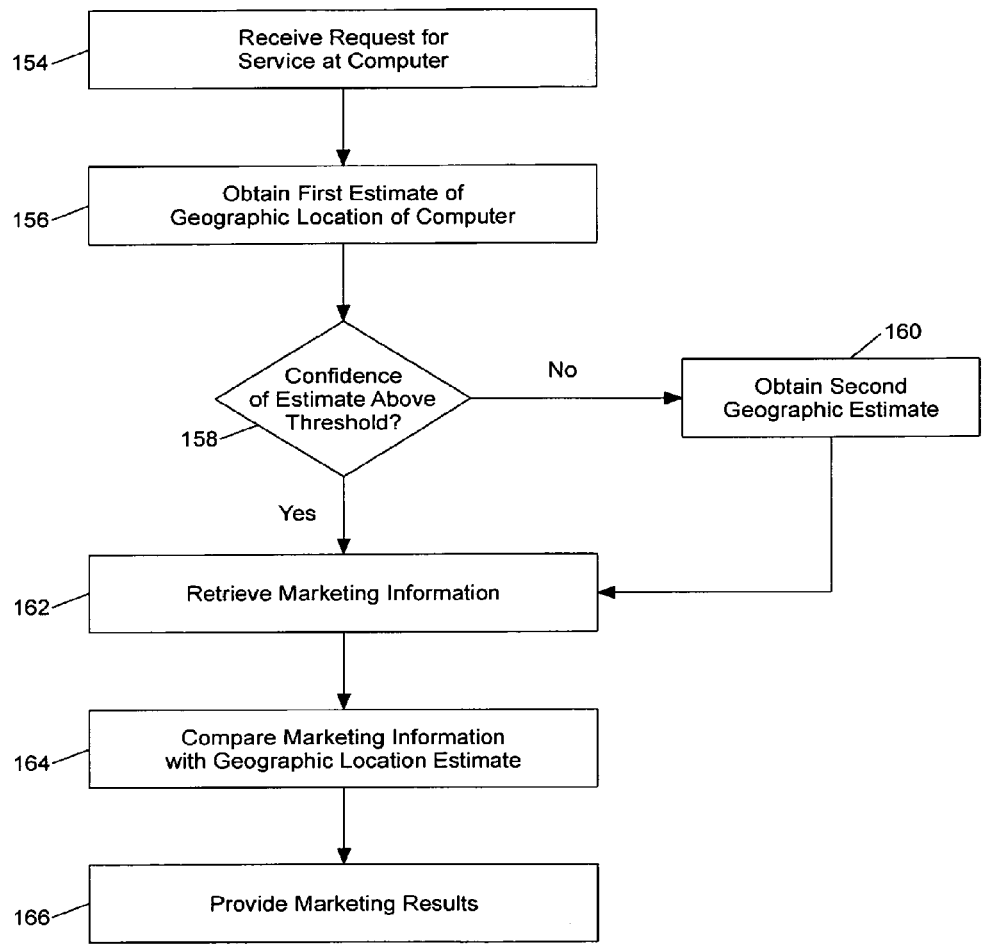
FIG. 8 is a flow diagram depicting operations performed in a process of providing targeted marketing based on determined geographic location in accordance with an exemplary embodiment.

FIG. 8 illustrates a flow diagram depicting operations in a process of providing targeted marketing based on determined geographic location. Additional, fewer, or different operations may be performed depending on the embodiment. In an operation 154, a host computer or web server receives a request for a service or product from a computer. In an operation 156, the host computer obtains a first estimate of the geographic location of the computer. This first estimate of the geographic location of the computer can be obtained in a same fashion as the first estimate of geographic location described as referenced to FIGS. 1 through 4(*a*) and (*b*). In an operation 158, the host computer determines whether the confidence factor or level of the geographic location estimate is above a pre-determined threshold. If the confidence level is not above the threshold, the host computer obtains a second geographic estimate. The second geographic estimate can be an address verification procedure or other geographic estimate procedure such as those described above.

In an operation 162, the host computer retrieves marketing information. In an operation 164, the retrieved marketing information is compared with the geographic location estimate. This comparison may include applying marketing rules associated with various marketing efforts. In an operation 166, the host computer provides marketing results based on a comparison and analysis in an operation 164.

While several embodiments of the invention have been described, it is to be understood that modifications and changes will occur to those skilled in the art to which the invention pertains. For example, various address verification procedures can been utilized in the system. A variety of techniques can be utilized in combination to improve the confidence level of geographic location information. Further, restrictions on presentation on the rules based event may include factors other than geographic location, such as customer age. Yet still further, while the exemplary embodiments described contemplate the subscription service being communicated over a network, such as the Internet, other communication means may also be utilized, such as cable television networks, satellite broadcast technologies, etc. Accordingly, the claims appended to this specification are intended to define the invention precisely.

What is claimed is:

1. A system comprising:
   a service computer configured to provide a subscription service to a subscriber computer via a network; and
   an event interface coupled to the service computer, wherein the event interface is configured to receive event information for a rules based event, wherein the subscription service includes communication of the event information to the subscriber computer;
   wherein the service computer is further configured to:
      determine a geographic location of the subscriber computer based on stored geographic information that is associated with an Internet Protocol (IP) address of the subscriber computer;
      determine a blackout geographic area of the subscription service and a blackout time of the subscription service;
      determine if the geographic location is within the blackout geographic area;
      determine if a time that the subscription service is to be provided to the subscriber computer is within the blackout time;
      deny the subscription service to the subscriber computer if it is determined that the geographic location is within the blackout geographic area and the time is within the blackout time; and
      provide a token uniform resource locator (URL) to the subscriber computer if it is determined that the subscriber computer is eligible to receive the subscription service, wherein the token URL is unique and specific to the IP address of the subscriber computer, and wherein unique identifier information corresponding to the rules based event is at an end of the token URL.

2. The system of claim 1, wherein the service computer is further configured to search a cached IP address table based on subscriber information associated with the subscriber computer, wherein the cached IP address table includes a previously determined IP address for a subscriber associated with the subscriber information.

3. The system of claim 2, wherein the service computer is further configured to compare the previously determined IP address for the subscriber with a current IP address of the subscriber.

4. The system of claim 3, wherein the geographic location is determined based on the stored geographic information if the previously determined IP address matches the current IP address.

5. The system of claim 2, wherein the subscriber information comprises an electronic mail address associated with the subscriber or the subscriber computer.

6. The system of claim 1, wherein the service computer is further configured to provide the subscriber computer with an option to purchase goods or services.

7. The system of claim 1, wherein the service computer is further configured to determine the geographic location based at least in part on a credit card number and a billing address that are associated with the subscriber computer.

8. The system of claim 1, wherein the service computer is further configured to determine the geographic location based at least in part on product registration information.

9. The system of claim 8, wherein the product registration information is received from the subscriber computer.

10. The system of claim 1, wherein the geographic location is not determined if a subscriber associated with the subscriber computer is identified as a preferred customer.

11. The system of claim 1, wherein the blackout time corresponds to a time period during which the rules based event is ongoing.

12. The system of claim 1, wherein determining the blackout geographic area is based on at least a portion of a uniform resource locator (URI) accessed by the subscriber computer.

13. The system of claim 1, wherein denying the subscription service comprises sending a blackout message to a subscriber.

14. A non-transitory computer-readable medium having computer-readable instructions stored thereon, the computer-readable instructions comprising:
- instructions to receive event information for a rules based event, wherein a subscription service includes communication of the event information to a subscriber computer;
- instructions to determine a geographic location of the subscriber computer based on stored geographic information that is associated with an Internet Protocol (IP) address;
- instructions to determine a blackout geographic area of the subscription service and a blackout time of the subscription service;
- instructions to determine if the geographic location is within the blackout geographic area;
- instructions to determine if a time that the subscription service is to be provided to the subscriber is within the blackout time;
- instructions to deny the subscription service to the subscriber computer if it is determined that the geographic location is within the blackout geographic area and the time is within the blackout time; and
- instructions to provide a token uniform resource locator (URL) to the subscriber computer if it is determined that the subscriber computer is eligible to receive the subscription service, wherein the token URL is unique and specific to the IP address of the subscriber computer, and wherein unique identifier information corresponding to the rules based event is an end of the token URL.

15. The non-transitory computer-readable medium of claim 14, further comprising instructions to search a cached Internet Protocol (IP) address table based on subscriber information.

16. The non-transitory computer-readable medium of claim 15, wherein the cached IP address table includes a previously determined IP address for a subscriber associated with the subscriber information.

17. The non-transitory computer-readable medium of claim 16, further comprising instructions to compare the previously determined IP address for the subscriber with a current IP address of the subscriber.

18. The non-transitory computer-readable medium of claim 16, wherein the instructions to determine the geographic location based on the stored geographic information are performed if the previously determined IP address matches the current IP address.

19. The non-transitory computer-readable medium of claim 14, wherein the subscription service provides the subscriber computer with an option to purchase goods or services.

20. The non-transitory computer-readable medium of claim 19, wherein the option to purchase includes purchase rules that vary depending on the geographic location of the subscriber computer.

21. The non-transitory computer-readable medium of claim 14, further comprising instructions to determine the geographic location based at least in part on a credit card number and a billing address associated with the subscriber computer.

22. The non-transitory computer-readable medium of claim 14, further comprising instructions to determine the geographic location based at least in part on product registration information.

23. The non-transitory computer-readable medium of claim 14, wherein the geographic location is not determined if a subscriber associated with the subscriber computer is identified as a preferred customer.

* * * * *